United States Patent
Kim et al.

(10) Patent No.: US 7,853,801 B2
(45) Date of Patent: Dec. 14, 2010

(54) SYSTEM AND METHOD FOR PROVIDING AUTHENTICATED ENCRYPTION IN GPON NETWORK

(75) Inventors: Kwang ok Kim, Wansan-gu (KR); Yool Kwon, Busan (KR); Bong Tae Kim, Yusong-gu (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 1042 days.

(21) Appl. No.: 11/589,031

(22) Filed: Oct. 26, 2006

(65) Prior Publication Data

US 2008/0040604 A1    Feb. 14, 2008

(30) Foreign Application Priority Data

Dec. 5, 2005    (KR) ............... 10-2005-0117780

(51) Int. Cl.
| | |
|---|---|
| G06F 11/30 | (2006.01) |
| H04L 9/32 | (2006.01) |
| H04L 12/28 | (2006.01) |
| G01R 31/08 | (2006.01) |
| H04K 1/00 | (2006.01) |
| H04L 12/44 | (2006.01) |
| H04L 9/08 | (2006.01) |
| H04L 9/30 | (2006.01) |
| H04B 10/20 | (2006.01) |

(52) U.S. Cl. .................. 713/189; 713/168; 713/170; 713/180; 380/256; 370/235; 370/389

(58) Field of Classification Search ............. 713/189, 713/168
See application file for complete search history.

(56) References Cited

U.S. PATENT DOCUMENTS 7,450,515 B2 * 11/2008 Song et al. ............... 370/236.2

(Continued)

FOREIGN PATENT DOCUMENTS

EP    0833241    4/1998

(Continued)

OTHER PUBLICATIONS

Hassan Naser, Hussein T. Mouftah, "A joint-ONU interval-based dynamic scheduling algorithm for ethernet passive optical networks", Aug. 2006, IEEE/ACM Transactions on Networking (TON), vol. 14 Issue 4, pp. 889-899.*

(Continued)

*Primary Examiner*—Matthew B Smithers
*Assistant Examiner*—Courtney D Fields
(74) *Attorney, Agent, or Firm*—LRK Patent Law Firm

(57) ABSTRACT

A system and a method for providing a secured transmission through an authenticated encryption for each ONU in downlink transmission of an OLT in GPON are provided. The GPON system includes an OLT for generating a GTC downlink frame by receiving data from an external service provider and ONUs for receiving the GTC downlink frame from the OLT and processing the received GTC downlink frame. The OLT performs the authenticated encryption for the generated GTC downlink frame according to the ONU by including an authentication generator and the ONU determines whether the GTC downlink frame is allowed to be processed or not by checking the authentication of the received GTC downlink frame through an authentication checker.

19 Claims, 10 Drawing Sheets

U.S. PATENT DOCUMENTS

| | | | |
|---|---|---|---|
| 2004/0073788 A1 | 4/2004 | Kim et al. | |
| 2004/0202470 A1 | 10/2004 | Lim et al. | |
| 2005/0232277 A1 | 10/2005 | See | |
| 2006/0129814 A1* | 6/2006 | Eun et al. | 713/168 |

FOREIGN PATENT DOCUMENTS

| | | |
|---|---|---|
| JP | 2003-198532 | 7/2003 |
| KR | 1020020039559 A | 5/2002 |
| KR | 1020040089423 A | 10/2004 |
| WO | WO 2010038938 A1 * | 4/2010 |

OTHER PUBLICATIONS

"Hash Functions and Data Integrity" by A. Menezes et al.; *Handbook of Applied Cryptography*, Chapter 9; CRC Press, 1996; pp. 321-383.

Murakami, et al., "Comparison of G-POD TC Protocols and Proposal for Multi-service", Technical Report of the IEICE, vol. 102, No. 19, Apr. 2002, pp. 57-60.

McGrew, et al., "The Galois/Counter Mode of Operation (GCM)", May 31, 2005.

ITU International Telecommunication Union, ITU-T G.984.3 (Feb. 2004)-Prepublished Version, Telecommunication Standardization Sector of ITU Series G: Transmission Systems and Media, Digital Systems and Networks, "Gigabit-Capable Passive Optical Networks (G-PON): Transmission Convergence Layer Specification G.984.3" pp. 1-108.

* cited by examiner

SYSTEM AND METHOD FOR PROVIDING AUTHENTICATED ENCRYPTION IN GPON NETWORK

RELATED APPLICATION

The present application is based on, and claims priority from, Korean Application Number 2005-117780 filed Dec. 5, 2005, the disclosure of which is hereby incorporated by reference herein in its entirety.

BACKGROUND OF THE INVENTION

1. Field of the Invention

The present invention relates to a gigabit-capable passive optical network (GPON), and more particularly, to a system and a method for providing a secured transmission through an authenticated encryption for each optical network unit (ONU) in downlink transmission of an optical line terminal (OLT) in GPON.

2. Description of the Related Art

Recently, International Telecommunication Union (ITU)-T G.984 group standardizes the specifications of a gigabit-capable passive optical network (GPON) for effectively transmitting an asynchronous transfer mode (ATM) cell, an Ethernet frame and a time-division multiplexing (TDM) packet through a passive optical network (PON) based subscriber access network and providing a maximum 2.5 Gbps bandwidth. The GPON is capable of providing a TDM service and an E1/T1 service, a plain old telephone service (POTS) using a frame based transmission scheme (125 μs cycle (8 KHz)), which is a same transmission scheme used by a synchronous optical network (SONET). The GPON also has a capability of providing a high quality broadcasting service and an Internet protocol (IP) data service through 2.5 Gpbs wide bandwidth. Such GPON is widely used in US and Europe as a replacement of an ATM PON (APON).

In a GPON system, an optical distributor receives optical signals transmitted based on a TDM scheme from single optical line terminal (OLT) and distributes the received optical signals to a plurality of optical network units (ONU). Since the conventional GPON system has a broadcast characteristic for downlink transmission, downlink frames are transmitted from the one OLT to the all ONUs in the GPON system. Accordingly, the ONU of the GPON system is designed to receive frames of their own by filtering transmitting frames. However, such a design of the ONU has a shortcoming. If a subscriber may illegally obtain valuable information transmitted to other ONUs by simply modifying a portion of the subscriber's ONU that filters the transmitting frames.

In order to hide information from being seen by other ONUs, the current GPON standard defines specifications to encrypt a payload of a service data based on a 128 bits counter (CRT)-advanced encryption standard (AES). However, the current GPON standard fails to define specifications to protect valuable information in a frame header such as a physical layer OAM (PLOAM) and bandwidth allocation (BA). Therefore, such valuable information in the frame header may be opened or easily modified to/by unauthorized ONUs and may be used by the unauthorized ONUs to disturb other ONUs with a harmful intention.

FIG. 1 is a block diagram illustrating a GPON system for providing an encryption function for encrypting a payload according to the related art.

Referring to FIG. 1, the GPON system according to the related art includes an optical line terminal (OLT) 11 for receiving data from an external service provider, transforming the received data to single optical signal and transmitting the optical signal, and receiving uplink data from a plurality of ONUs 12 and transmitting the received uplink data to an external unit; and the ONU 12 as a user side device for receiving an optical signal provided from the OLT 11, converting the received optical signal to an electric signal and providing the electric signal to a user.

In order to create uplink/downlink data, the OLT 11 includes: a header generator 101 for generating a frame header by receiving a dynamic bandwidth allocation (DBA) having bandwidth allocation information and a PLOAM to transmit PLOAM information; a payload generator 102 for receiving an ATM service data unit (SDU) and a GEM service data unit (SDU) and independently processing them; a payload encrypter 103 for receiving the ATM base-processed payload and the GEM base-processed payload data and encrypting the received payload data, separately; a multiplexer 104 for multiplexing the header created by the header generator 101 and the payloads encrypted by the payload encrypter 103 to create one downlink signal; and an electric-optical converter 105 for converting the downlink signal to an optical signal.

The header generator 101 generates a frame header including a DBA information denoting uplink band information of the ONUs 12, a PLOAM denoting network control and management information, a synchronization pattern information, a GTC downlink frame counter, a FEC setting information and a frame payload length information.

The payload generator 102 includes an ATM partition module for receiving and processing an ATM service data unit (SDU) from an external service provider and a GEM partition module for receiving and processing a GEM service data unit (SDU) from an external service provider. The ATM partition module of the payload generator 102 processes an ATM cell configured of a 5-byte of ATM header and a 48-byte of payload. The GEM partition module process a GEM frame configure of a 5-byte of GEM header and a payload having variable length shorter than 4095 bytes.

The payload encrypter 103 performs a 128-bit CTR-AES block encryption. That is, the payload encrypter 103 generates a 46-bit crypto-counter by combining a 30-bit GTC downlink frame counter and a 16-bit block counter and generates a 138-bit random encryption counter by connecting three of the 46-bit crypto-counters. Then, the payload encrypter 103 deletes uppermost 10 bits of the generated 138-bit random encryption counter and uses the remained 128-bit encryption block counter for the encrypting. Herein, the 30-bit GTC downlink frame counters increases by one when the frame is transmitted to downlink. Also, the 16-bit block counter increases a counter by four bytes and is initialized as '0' when one GTC downlink frame is transmitted. The 128-bit encryption key used in the payload encrypter 103 is generated from each of the ONUs 12 and is received by the OLT 11's request.

As described above, if the payload encrypter 103 encrypts the 128-bit encryption block counter value using the 128-bit ONU key transmitted from each of the ONUs 12, the payload is encrypted by performing an exclusive-OR on the 128-payload block with the encrypted value. The encrypted payloads are transmitted to the multiplexer 104, and the multiplexer 104 generates the GTC downlink frame by multiplexing the frame header from the header generator 101 and the encrypted payload.

Then, the generated GTC downlink frame is converted to an optical signal through the electric-optical converter 105, and the optical signal is transmitted to each of the ONUs 12.

While generating the GTC downlink frame, the frame header 120 generated at the header generator 101 is included in the GTC downlink frame after processing the frame header 120 based on an In-band scheme without encrypting. Therefore, the GTC downlink frame is transmitted to the ONUs 12 with the GTC downlink frame payload 130 encrypted without encrypting the GTC downlink frame header 120.

Meanwhile, the optical network unit (ONU) 12 includes: an optical-electric converter 106 for receiving the GTC downlink frame that is an optical signal and converting the GTC downlink frame to an electric signal; a de-multiplexer 107 for de-multiplexing the electric GTC downlink frame to a header and a payload; a header processor 110 for receiving the frame header from the de-multiplexer 107 and processing the frame header; a payload decrypter 108 for receiving the payload from the de-multiplexer 107 and decrypting the payload; and a payload processor 109 for processing the decrypted payload.

The payload decrypter 108 performs a corresponding function to the payload encrypter 103 in the OLT 11. That is, the payload decrypter 108 decrypted the ATM cell and the GEM frame encrypted in the payload encrypted 103.

The payload processor 109 includes the ATM partition module and the GEM partition module. The ATM partition module processes the 53-byte ATM cell configured of the 5-byte ATM header and the 48-byte payload. The GEM partition module processes the GEM frame configured of the 5-byte GEM header and the payload having a variable length shorter than 4095-byte.

FIG. 2 is a conceptual view illustrating a possible hacking attempt made on a GPON system providing an encryption function for encrypting a payload according to the related art.

Referring to FIG. 2, the possible hacking attempt to a GTC downlink frame of the conventional GPON system is generally classified into four types.

As a first hacking type, a hacker 204 may illegally obtain information from GTC downlink frames 201 transmitted to all of ONUs 207, 210 and 211 by the trespassing a common link S200 between an OLT 200 and an optical splitter 209 that optically distributes the optical signal from the OLT 200 to all of the ONUs 207, 210 and 211. Herein, the GTC downlink frames 201 are hacked through modifying, intercepting or monitoring. Although the hacker 204 successfully hacks the GTC downlink frames 201, the hacker 204 cannot hack the payload 201 of the GTC download frame because the payload 201 is encrypts. However, valuable information in the header such as PLOAM information 202 and DBA information 203 may be outflow by the. Such a first hacking attempt type must cut the link S200 to trespass. Therefore, it is a very difficult hacking method for a normal person. However, there are great possibilities that the conventional GPON system may be hacked by experts using the first hacking type.

As a second type of hacking attempt, a hacker 205 may obtain the valuable information 202 and 203 through an encryption attack such as modifying, interrupting and monitoring the GTC downlink frames 201 transmitted to the ONU 207 by accessing a link S201 between the splitter 209 and the ONU 207. The second hacking attempt type must also trespass the link S200. Therefore, it is a very difficult hacking method for a normal person. However, there are great possibilities that the conventional GPON system may be hacked by experts using the second hacking type.

As a third type of hacking attempt, a hacker 206 creates a fraud ONU 207 and obtains information transmitted to other ONU 210 without filtering by simple modification of program. Such a third hacking method uses the fraud ONU 211 acting like the real ONU 210 or disturbs uplink transmission of the real ONU 210.

As a fourth type of hacking attempt, a hacker 207 hacks the GPON system by accessing a remained port of a splitter 209 between the OLT 200 and the ONU 211 or receives the GTC downlink frame without filtering by adding a splitter 208 to a link between the splitter 209 and the ONU 211. In the fourth hacking method, the hacker 207 acts like a real ONU 211 or disturb uplink transmission of the real ONU 211. Since the fourth hacking method can intercept an encryption key transmitted from the ONU 211 through the uplink, the hacker 207 may obtain the encrypted data in the frame. Therefore, the fourth hacking method may be lethal to cause great damage.

Therefore, there are great demands of authenticated encryption for GTC downlink frames in the GPON system and a method for protecting the GTC downlink frames from the unauthenticated ONUs to open the valuable information.

SUMMARY OF THE INVENTION

Accordingly, the present invention is directed to a system and method for providing an authenticated encryption in GPON that substantially obviates one or more problems due to limitations and disadvantages of the related art.

An object of the present invention is to provide a GPON system for a secured transmission through an authenticated encryption by authenticating ONUs using an authentication algorithm and allowing only the authenticated ONUs to receive GTC frame information transmitted through a downlink so as to protect un-encrypted information from being outflow by hacking the GTC frames transmitted through downlink in a GPON system, and a method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a GPON (Gigabit-cable passive optical network) system for allowing a secured transmission through an authenticated encryption includes: an OLT (optical line terminal) for receiving data from an external service provider, generating a GTC (GPON Transmission Convergence) downlink frame and transmitting the generated GTC downlink frame through a downlink; and an ONU (optical network unit) for receiving the GTC downlink frame transmitted from the OLT through the downlink and processing the received GTC downlink frame, wherein the OLT performs an authenticated encryption on the generated GTC downlink frame by including an authentication generator for authenticating the generated GTC downlink frame according to the ONU, and the ONU determines whether the GTC downlink frame is allowed to receive or not according to whether the authentication of the authentication encrypted GTC downlink frame is succeeded or failed by including an authentication checker.

According to an aspect of the present invention, there is provided an OLT (optical line terminal) in a GPON (Gigabit-cable passive optical network) providing a secured transmission through an authenticated encryption, the OLT including: a header generator for generating a frame header; a payload generator for receiving an ATM SDU (service data unit) and a GEM SDU (service data unit) and processing the received ATM SDU and the received GEM SDU, separately; a payload encrypter for receiving the processed ATM SDU payload and the processed GEM SDU payload data from the payload generator and encrypting the processed ATM SDU payload data and the processed GEM SDU payload data, independently; a multiplexer for multiplexing the header generated from the header generator and the encrypted payload from the payload encrypter to generate one GTC downlink frame; and an authentication generator for generating an authentication parameter for an authenticated encryption of the GTC downlink frame multiplexed through the multiplexer.

According to another aspect of the present invention, there is provided an ONU (optical network unit) of a GPON (gigabit-capable passive optical networks) system for providing a secured transmission through an authenticated encryption, the ONU including: an optical-electric converter for receiving a GTC downlink frame having an ICV' transmitted as an optical signal from an OLT (optical line terminal) and transforming the optical signal of the GTC downlink frame to an electric signal of the GTC downlink frame; an authentication checker for checking whether the electric GTC downlink frame having the ICV is authenticated or not; a de-multiplexer for dividing the authenticated GTC downlink frame into a header and a payload; a header processor for receiving the header from the de-multiplexer and processing the header; a payload decrypter for receiving the payload fro the de-multiplexer and decrypting the payload; and a payload processor for processing the decrypted payload.

According to still another aspect of the present invention, there is provided a method of authenticated encryption in a GPON (Gigabit-cable passive optical network) system providing a secured transmission through the authenticated encryption, including the steps of: a) generating a GTC downlink frame at an OLT (optical line terminal) at the GPON system; b) determining whether an authentication mode is used to transmit the generated GTC downlink frame or not; c) checking whether an authentication key is in the OLT for authentication if the authentication mode is used; d) authenticated encrypting the GTC downlink frame and transmitting the encrypted GTC downlink frame if there is the authentication; and e) transmitting the GTC downlink frame without the authenticated encryption if the authentication mode is not used at step b) and if there is no authentication key.

According to the further still another aspect of the present invention, there is provided a method of authenticated decryption in a GPON (Gigabit-cable passive optical network) system for providing a secured transmission through an authenticated encryption, the method including the steps of: a) receiving a GTC downlink frame at an ONU (optical network unit) of the GPON system; b) determining whether an authentication mode is used to process the received GTC downlink frame or not, and storing the received GTC downlink frame if the authentication mode is used; c) checking whether an authentication key is existed or not to authenticate the GTC downlink frame stored in the ONU; d) checking the authentication of the stored GTC downlink frame if there if the authentication key existed, transmitting the stored GTC downlink frame if the authentication of the GTC downlink frame is succeeded and processing the GTC downlink frame; and e) deleting the stored GTC downlink frame if there is not authentication key existed at the step c) or if the authentication is failed at the step d).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 3:
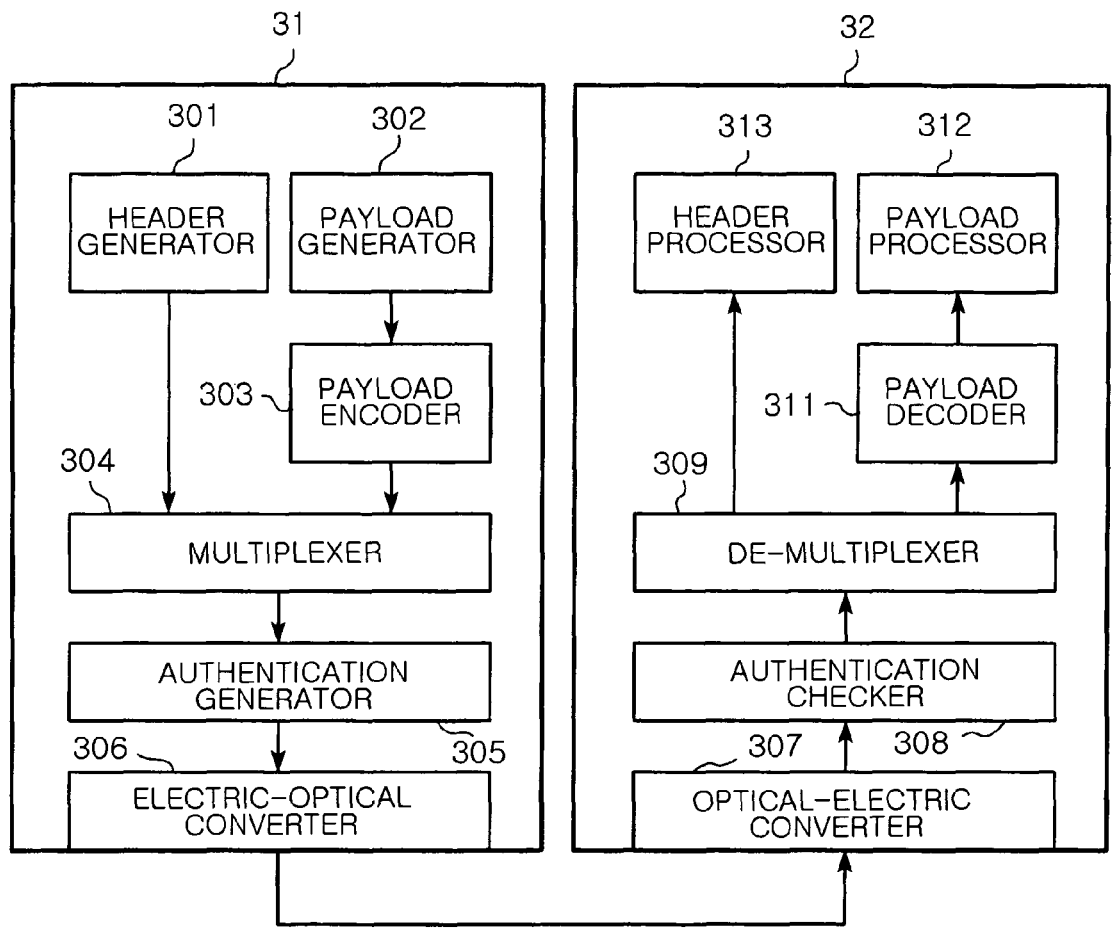
FIG. 3 is a block diagram illustrating a GPON system for providing a secured transmission through an authenticated encryption according to an embodiment of the present invention.

FIG. 3 is a block diagram illustrating a GPON system for providing a secured transmission through an authenticated encryption according to an embodiment of the present invention.

Figure 1:
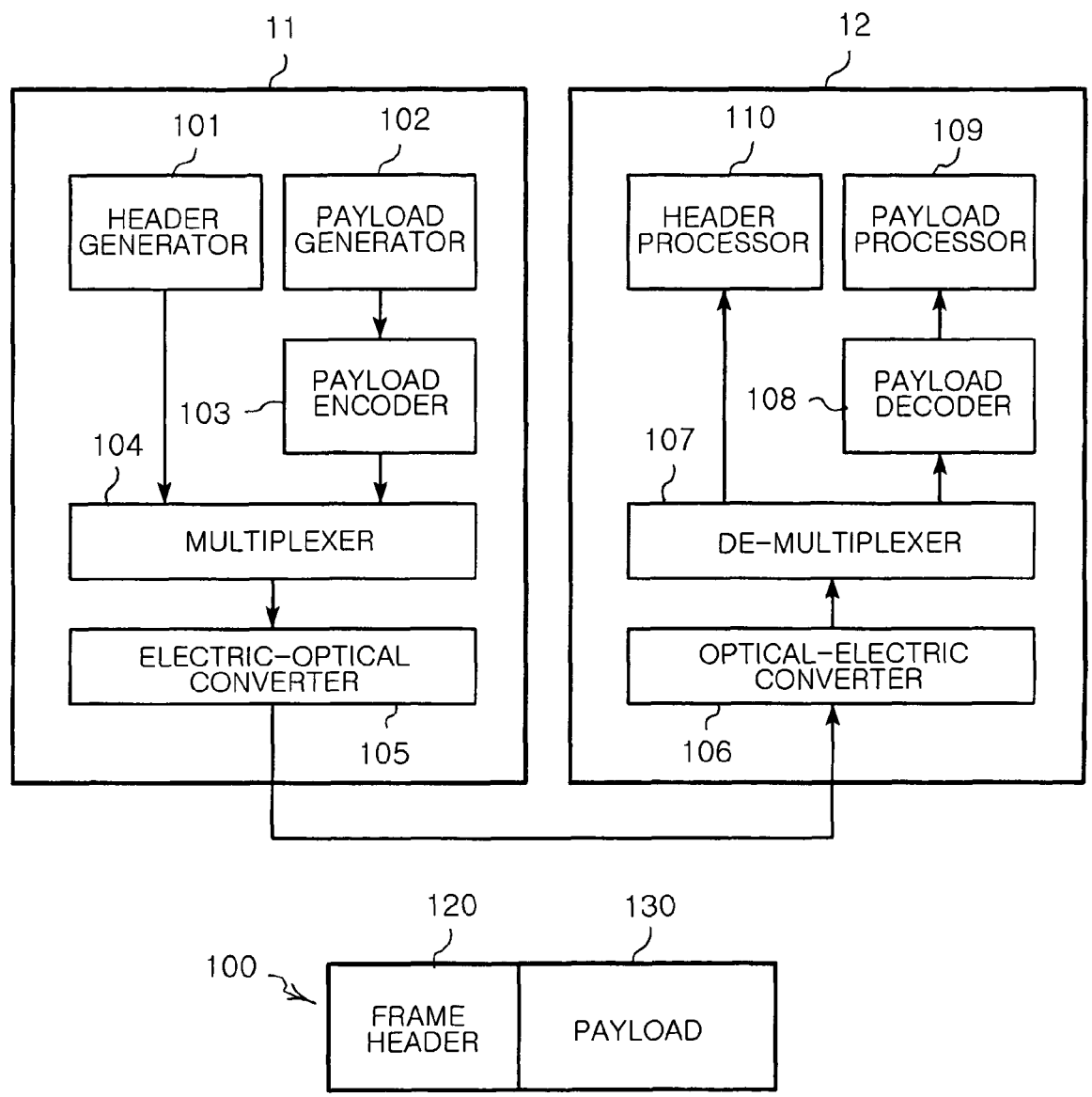
FIG. 1 is a block diagram illustrating a GPON system for providing an encryption function for encrypting a payload according to the related art.
Figure 2:
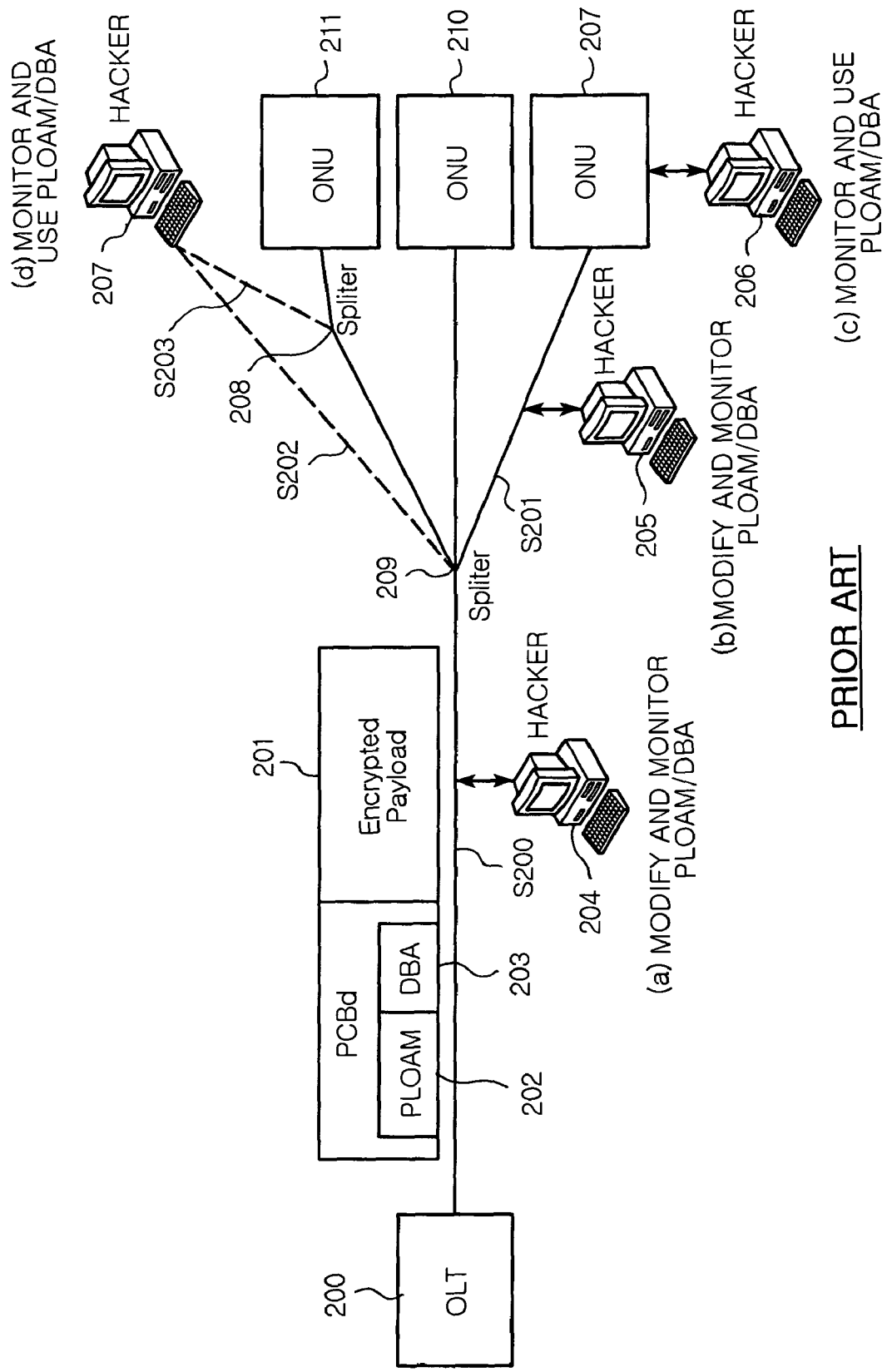
FIG. 2 is a conceptual view illustrating a possible hacking attempt made on a GPON system providing an encryption function for encrypting a payload according to the related art.

Referring to FIG. 3, the GPON system according to the present embodiment has a configuration identical to the GPON system according to the related drawing shown in FIG. 1 excepting between an optical line terminal (OLT) 31 and an optical network unit (ONU) 32. The OLT 31 and the ONU 32 according to the present embodiment further include an authentication generator 305 and an authentication checker 308 for authenticated encryption, respectively.

In order to create uplink/downlink data, the OLT 31 includes: a header generator 301 for generating a frame header by receiving a dynamic bandwidth allocation (DBA) having bandwidth allocation information and a PLOAM data to transmit PLOAM information; a payload generator 302 for receiving an ATM service data unit (SDU) and a GEM service data unit (SDU) and independently processing them; a payload encrypter 303 for receiving the ATM base-processed payload and the GEM base-processed payload and encrypting the received payload, separately; a multiplexer 304 for multiplexing the header created by the header generator 301 and the payloads encrypted by the payload encrypter 303 to create one downlink signal; an authentication generator 305 for generating authentication parameters for the authenticated encryption for the multiplexed GTC downlink frame 100; and an electric-optical converter 306 for converting the downlink signal to an optical signal.

The header generator 301 generates a frame header including a DBA information denoting uplink band information of the ONUs 12, a PLOAM message denoting network control and management information, a synchronization pattern information, a GTC downlink frame counter, a FEC setting information and a frame payload length information.

The payload generator 302 includes an ATM partition module for receiving and processing an ATM service data unit (SDU) from an external service provider and a GEM partition module for receiving and processing a GEM service data unit (SDU) from an external service provider. The ATM partition module of the payload generator 302 processes an ATM cell configured of a 5-byte of ATM header and a 48-byte of payload. The GEM partition module process a GEM frame configure of a 5-byte of GEM header and a payload having variable length shorter than 4095 bytes.

The payload encrypter 303 performs a 128-bit CTR-AES block encryption. That is, the payload encrypter 103 generates a 46-bit crypto-counter by combining a 30-bit GTC downlink frame counter and a 16-bit block counter and generates a 138-bit random encryption counter by connecting three of the 46-bit crypto-counters. Then, the payload encrypter 303 deletes most significant data (MSB) 10 bits of the generated 138-bit random encryption counter and uses the remained 128-bit encryption block counter for the encrypting. Herein, the 30-bit GTC downlink frame-counter increases by one when the frame is transmitted to downlink. Also, the 16-bit block counter increases a counter by four bytes and is initialized as '0' when one GTC downlink frame is transmitted. The 128-bit encryption key used in the payload encrypter 303 is generated from each of the ONUs 12 and is received by the OLT 11's request.

As described above, if the payload encrypter 303 encrypts the 128-bit encryption block counter value using the 128-bit ONU key transmitted from each of the ONUs 12, the payload is encrypted by performing an exclusive-OR on the 128-payload block with the encrypted value. The encrypted payloads are transmitted to the multiplexer 304, and the multiplexer 304 generates the GTC downlink frame by multiplexing the frame header from the header generator 301 and the encrypted payload.

Then, the authentication generator 306 calculates authentication parameter values for a corresponding GTC downlink frame in the multiplexed GTC downlink frames from the multiplexer 305 and adds the calculated authentication parameter values at the end of the corresponding GTC downlink frame.

The authentication parameter added GTC downlink frame is converted to an optical signal through the electric-optical converter 306, and the optical signal is transmitted to each of the ONUs 32.

While generating the GTC downlink frame, the frame header 120 generated at the header generator 301 is included in the GTC downlink frame after processing the frame header 120 based on an In-band scheme without encrypting. Therefore, the GTC downlink frame is transmitted to the ONU 32 with the GTC downlink frame payload 130 encrypted without encryption the GTC downlink frame header 120.

Meanwhile, the optical network unit (ONU) 32 includes: an optical-electric converter 307 for receiving the GTC downlink frame that is an optical signal and converting the GTC downlink frame to an electric signal; an authentication checker 308 for checking whether the converted GTC downlink frame is authenticated or not; a de-multiplexer 309 for de-multiplexing the authenticated GTC downlink frame to a header and a payload; a header processor 310 for receiving the frame header from the de-multiplexer 309 and processing the frame header; a payload decrypter 311 for receiving the payload from the de-multiplexer 309 and decrypting the payload; and a payload processor 312 for processing the decrypted payload.

The payload decrypter 311 performs a corresponding function to the payload encrypter 303 in the OLT 31. That is, the payload decrypter 311 decrypts the ATM cell and the GEM frame encrypted in the payload encrypter 303.

The payload processor 312 includes the ATM partition module and the GEM partition module. The ATM partition module processes the 53-byte ATM cell configured of the 5-byte ATM header and the 48-byte payload. The GEM partition module processes the GEM frame configured of the 5-byte GEM header and the payload having a variable length shorter than 4095-byte.

As described above, the GPON system according to the present embodiment provides the authentication function to a corresponding GTC downlink frame as well as encrypting the information in the frame payload in the GTC downlink frame. Therefore, the GPON system according to the present embodiment deters unauthenticated ONUs 32 from receiving and processing a GTC downlink frame.

Hereinafter, the authentication generator 305 and the authentication checker 308, which are the major elements of the present invention, will be described in more detail. The authentication generator 305 calculates authentication parameter value for a GTC downlink frame multiplexed at the multiplexer 304, adds the calculated authentication parameter value at the end of corresponding GTC downlink frame and transmits the authentication parameter added GTC downlink frame through the downlink.

The authentication parameter values are calculated through several calculating processes using a Galois Field (GF) ($2^{128}$) multiplier and the GF multiplier uses a 128-bit hash-key value. The payload encrypter 303 generates the 128-bit hash-key value using an authentication key value generated at the OLT 31 using an ONU key value provided from each of the ONUs 32. The generation of the 128-bit hash-key value will be described with reference to FIGS. 5A and 5B.

Meanwhile, the ONU 32 performs following operations when the ONU 32 receives a GTC downlink frame for authenticated encryption according to the present invention. The ONU 32 receives and stores an authentication key value from the OLT 31 before performing the authentication function for the GTC downlink frame. As the authentication key value, a hash-key value generated by the OLT 31 is used. When the ONU 32 receives the GTC downlink frame, the ONU 32 controls the authentication checker 308 to authenticate the received GTC downlink frame to determine whether the received GTC downlink frame can be processed or not in the corresponding ONU 32. That is, the ONU 32 calculates an authentication parameter value using the stored authentication value and compares the calculated authentication parameter value and an authentication parameter value added at the end of the authenticated and encrypted GTC downlink frame to authenticate the received GTC downlink frame. If the two compared values are identical, it determines that the ONU 32 to have a right to process the received the GTC downlink frame, that is, the authentication process is succeeded. Therefore, the received GTC downlink frame is transmitted to the de-multiplexer 309. If the two compared values are different, the received GTC downlink frame is damped because the authentication is failed.

Figure 4:
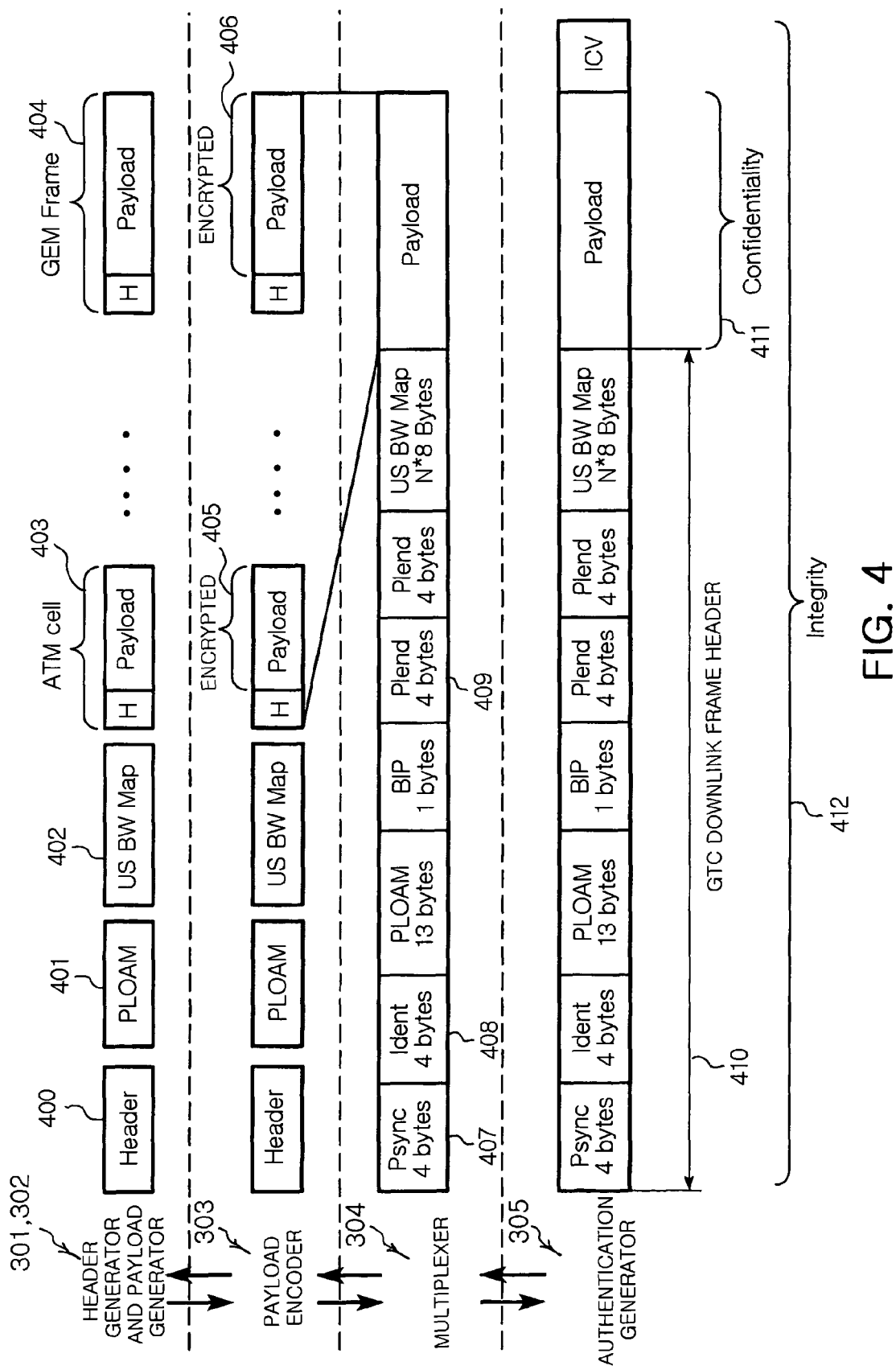
FIG. 4 shows structures of frames created by each of elements in a GPON system providing a secured transmission through an authenticated encryption according to an embodiment of the present invention.

FIG. 4 shows structures of frames created by each of elements in a GPON system providing a secured transmission through an authenticated encryption according to an embodiment of the present invention.

Referring to FIG. 4, the structures of frames created by each of the elements in a GPON system according to the present invention are classified by the header generator 301 and the payload generator 302, the encrypter 303, the multiplexer 304 and the authentication generator 305.

In the header generator 301 and the payload generator 302, the header information 400, a PLOAM message 401, a uplink band allocation information 402, an ATM cell 403 and a GEM frame 404 are inputted to the GTC downlink frame, independently.

In the encrypter 303, encryptions are performed to encrypt payloads 405 and 406 in the inputted ATM cell 403 and GEM frame 404 with same structure of frame made by the header generator 301 and the payload generator 302.

In the multiplexer 304, a frame header 401 of a GTC downlink frame is created using the header information 400, the PLOAM message 401, and the uplink band allocation information 402. Then, the ATM cell 405 encrypted in the encrypter 303 is loaded in the GTC downlink frame payload 41 at first. Then, the ATM cell 405 is loaded in the GTC downlink frame payload 41 and the encrypted GEM frame 406 is loaded at the remained payload space. Herein, fields of Psync, Ident, BIP and Plend fields in the header 410 of the GTC downlink frame are loaded according to the header information 400.

In the authentication generator 305, an integrity check value (ICV) that is the authentication parameter is calculated for the GTC downlink frame created at the multiplexer 304 and the calculated ICV is added at the end of the GTC downlink frame. Such a GTC downlink frame configured as the above described structure provides the authentication to the entire GTC downlink frame as well as the encryption for data transmitted by the payload 411 in the GTC downlink frame according to the present invention.

It is obvious to those skilled in the drawing that structures of frames created by the elements of the GPON system according to the present invention for authenticated decrypting are reverse from the shown structures in FIG. 4. Therefore, detail thereof is omitted herein.

Figure 5A:
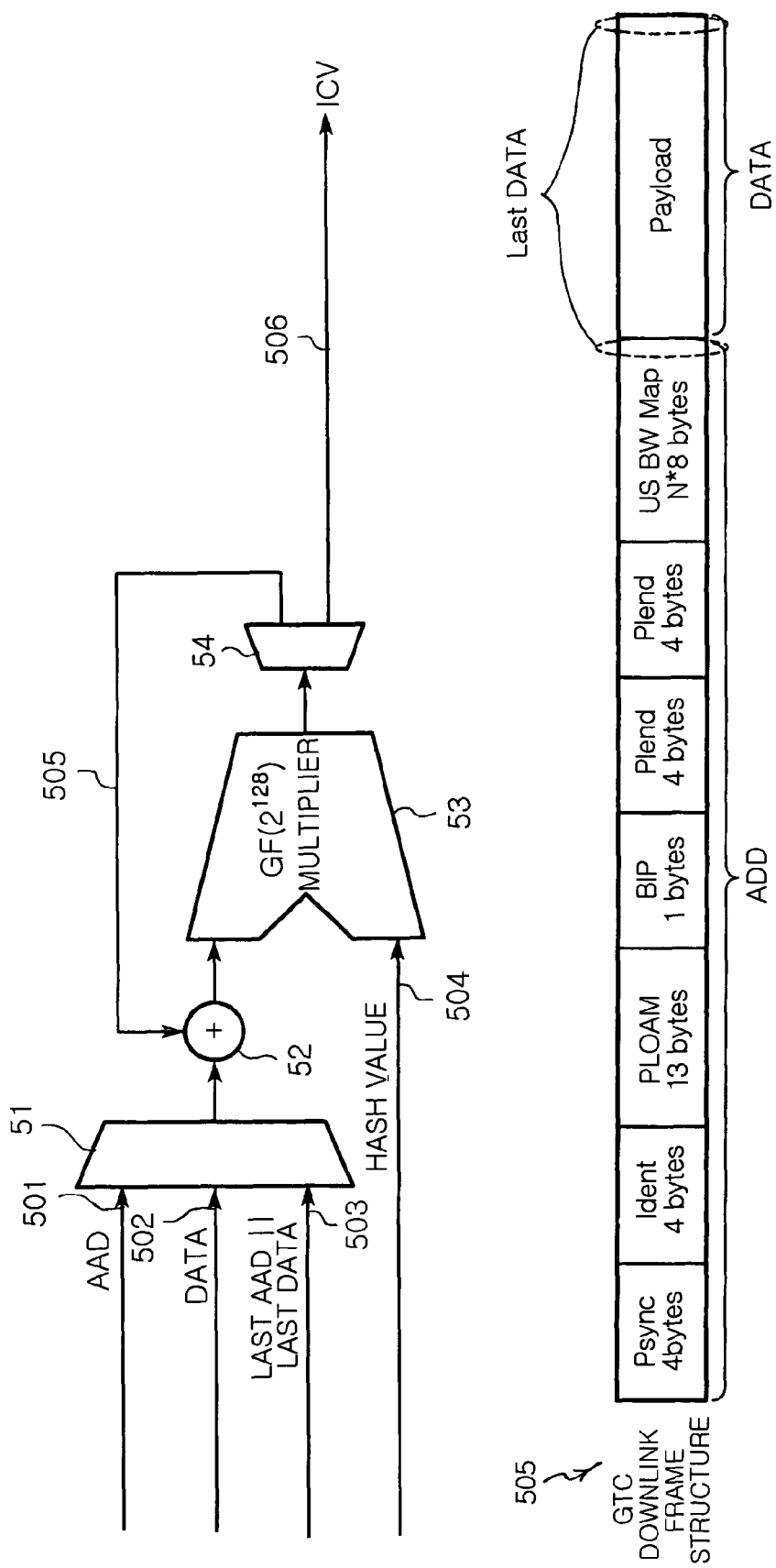
FIGS. 5A and 5B are a block diagram showing the authentication generator and the authentication checker shown in FIG. 3.
Figure 5B:
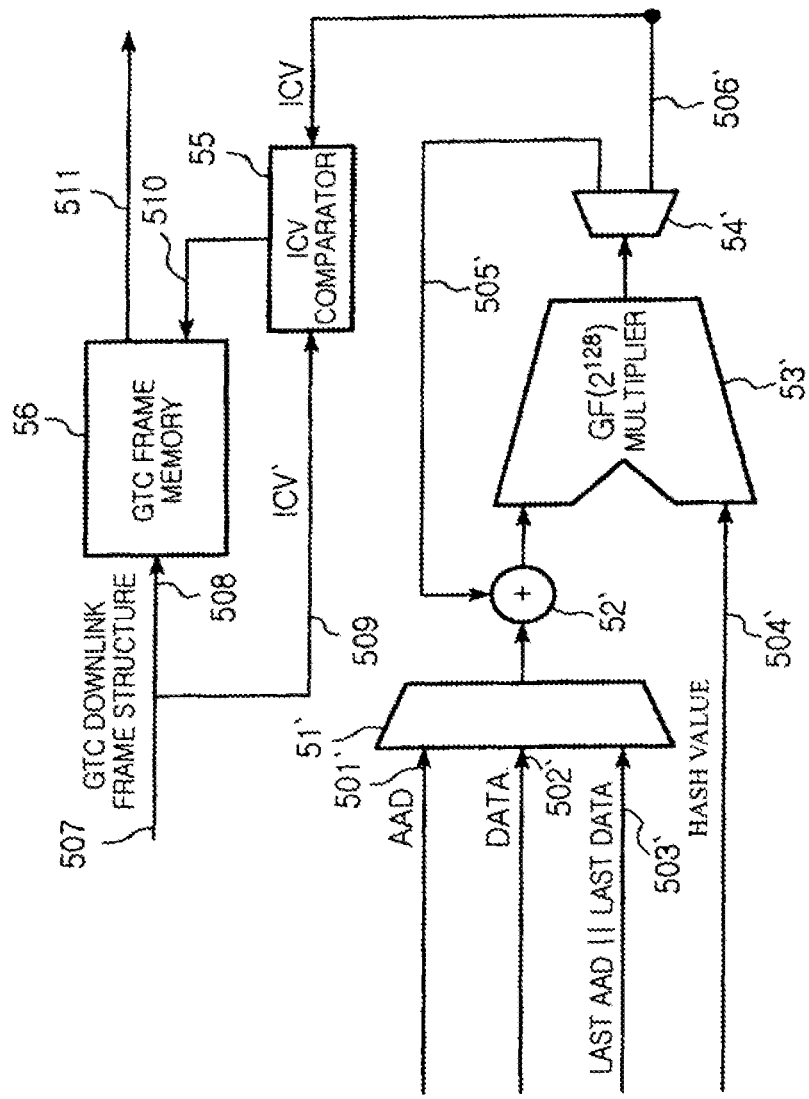

FIGS. 5A and 5B are a block diagram showing the authentication generator and the authentication checker shown in FIG. 3.

As shown in FIG. 5A, the authentication generator 305 includes a data input unit 51 for receiving the multiplexed downlink frames and outputting the received downlink frames, sequentially; an operator 52 for logically adding the output of the data input unit 51 and a $GF(2^{128})$ multiplier 53; the $GF(2^{128})$ multiplier for performing a $GF(2^{128})$ multiplication on the output of the operator 52 and a received hash value; and a splitter 54 for splitting the output of the $GF(2^{128})$ multiplier 53 to the operator 52 and outputting the final output of the $GF(2^{128})$ multiplier 53 as the ICV.

When the GTC downlink frame 500 having the structure shown in FIG. 5A is inputted to the data input unit 51, the data input unit 51 divides and classifies header information of the GTC downlink frame into 128-bit block units and outputs the 128-bit block units of divided header information to the operator 52 as an additional authenticated data (AAD) (501). If the all of AADs 501 are outputted to the operator 52, the payload information of the GTC downlink frame is divided and classified into 128-bit block units and the divided payload information are outputted to the operator 52 as DATA (502). After all of the header and the payload of the GTC downlink frame are inputted as the AAD (501) and the DATA (502), the data input unit 51 combines the 64-bit of the last AAD (501) and the 64-bit of the last DATA (502) and outputs the combined data to the operator 52.

The operator 52 performs an exclusive-OR operation on the first 128-bit of the AAD value (501) with an initial feedback value '0', and outputs the result thereof to the $GF(2^{128})$ multiplier 53.

The $GF(2^{128})$ multiplier 53 receives the result of the exclusive-OR operation and the 128-bit hash value (504) and multiplies the result of the exclusive-OR operation and the 128-bit hash value 504. Then, the $GF(2^{128})$ multiplier 53 feeds the multiplying result back to the operator 52 (505). The operator 52 performs the exclusive-OR operation on the data inputted through the data input unit 51 with the feed-back result inputted through the splitter 54 and outputs the result thereof to the $GF(2^{128})$ multiplier 53. Such an operation is repeatedly performed until all of the header and the payload in the GTC downlink frame are inputted as the AADs (501) and the DATAs (502).

After all of the header and the payload in the GTC downlink frame are inputted as the AADs (501) and the DATAs (502), the data input unit 51 combines the 64-bit of the last AAD (501) and the 64-bit of the last DATA (502) and outputs the combination result. The combination result is calculated through the operator 52 and the $GF(2^{128})$ multiplier 53 and the calculating result is outputted as the authentication parameter value (506) for the corresponding GTC downlink frame. The authentication parameter value (506) is outputted as the ICV value. The ICV value is added at the end of the GTC downlink frame and the ICV value added GTC downlink frame is transmitted.

Meanwhile, the authentication checker 308, as shown in FIG. 5B, receives the GTC downlink frame (507) having ICV' (509) and temporally stores the GTC downlink frame (508) excepting the ICV' (509) at a GTC frame memory 56. According to the authentication result using the ICV' (509), it determines whether the GTC downlink frame (508) excepting the ICV' (509) will be transmitted or not. The authentication process in the authentication checker 308 is performed by comparing the ICV' (509) transmitted from the OLT 32 and another ICV (506') calculated through inputting the GTC downlink frame excepting the ICV' (509) to the data input unit 51'.

The configuration of the authentication checker 308 for the ICV calculation is correspondent to that of the authentication generator 306 shown in FIG. 5A. That is, e authentication checker 308 includes a data input unit 51' for receiving a GTC downlink frame (508) excepting the ICV'(509) and outputting the received GTC downlink frame in sequence; an operator 52' for logically adding the output of the data input unit 51' and an output of a $GF(2^{128})$ multiplier 53'; a $GF(2^{128})$ multiplier 53' for receiving and multiplying the output of the operator 52' and a hash value; and a splitter 54' for splitting the output of the $GF(2^{128})$ multiplier 53' to the operator 52' and outputs the final output (506') of the $GF(2^{128})$ multiplier 53' as ICV to a comparator 55.

Hereinafter, the operations of the authentication checker 308 will be described in detail. When the GTC downlink frame 508 excepting the ICV' (509) is inputted to the data input unit 51', the data input unit 51' divides and classifies the header information of the inputted GTC downlink frame (508) excepting the ICV' (509) into 128-bit block units and outputs the 128-bit block units of the header information to the operator 52' as an additional authenticated data (AAD) (501'). After all of the AAD (501') value is outputted to the operator 52', the data input unit 51' divides and classifies the payload information of the inputted GTC downlink frame (508) excepting the ICV' (509) into 128-bit block units and outputs the 128-bit block units of the payload information to the operator 52' as DATA (502'). After all of the header and the payload of the inputted GTC downlink frame 508 excepting the ICV' (509) are inputted as the AAD (501') and DATA (502'), the data input unit 51' combines the 64-bit of last AAD 501' and the 64-bit of last DATA 502' and outputs the combination result to the operator 52'.

The operator 52' performs the exclusive-OR operation on the 128-bit of the first AAD value (501') with an initial feedback value '0' and outputs the result of the exclusive-OR operation to the $GF(2^{128})$ multiplier 53'.

The $GF(2^{128})$ multiplier 53' receives and multiplies the result of the exclusive-OR value from the operator 52' and a 128-bit hash value (504') and feeds the multiplying result back to the operator 52' (505'). The operator 52' performs the exclusive-OR operation on the inputted data through the data input unit 51' and the feedback result through the splitter 54'. The operator 52' outputs the result of the exclusive-OR operation to the $GF(2^{128})$ multiplier 53'. Such an operation is repeatedly performed until the entire header and payload of the GTC downlink frame are inputted as the AAD (501') and DATA (502').

After the entire header and payload of the GTC downlink frame are inputted as the AAD (501') and DATA (502'), the data input unit 51' combines the 64-bit of the last AAD (501') and the 64-bit of the last DATA (502') and outputs the combination result (503'). The combination result is calculated through the operator 52' and the $GF(2^{128})$ multiplier 53' and the calculating result is outputted as the authentication parameter (506') for a corresponding GTC downlink frame. The authentication parameter (506') is outputted as an ICV to the ICV comparator 55 to perform the authentication process.

The ICV comparator 55 receives the ICV' (509) included in the GTC downlink frame 507 from the OLT 31 and another ICV (506) calculated at the splitter 54' and compares the ICV' (509) and another ICV (506).

If the ICV' (509) and another ICV (506) are identical, the GTC downlink frame 508 stored in the GTC frame memory 56 is transmitted to the de-multiplexer 309 because the authentication is succeeded. If not, the GTC downlink frame 508 stored in the GTC frame memory 56 is deleted without transmitting to the de-multiplexer 309.

The hash key values 504 and 504' used in the authentication generator 305 and the authentication checker 308 are generated through the payload encrypter 303 using a corresponding authentication encryption key value while generating the GTC downlink frame header in the multiplexer 304 after the authenticated encryption key is updated.

The authentication parameter is calculated in the authentication generator 305 and the authentication checker 308 as below Eq. 1.

$$H = E(K, 0^{128})$$

$$X_i = 0, \text{ for } i=0$$

$$= (X_{i-1} \oplus AAD_i) \cdot H \text{ for } i=1, \ldots, m-1$$

$$= (X_{m-1} \oplus (AADA*_m \| 0^{128-v})) \cdot H \text{ for } i=m$$

$$= (X_{i-1} \oplus DATA_i) \cdot H \text{ for } i=m+1, \ldots, m+n-1$$

$$= (X_{m+n-1} \oplus (DATA*_m \| 0^{128-u})) \cdot H \text{ for } i=m+n$$

$$= (X_{m+n} \oplus (\text{len}(AAD) \| \text{len}(DAA))) \cdot H \text{ for } i=m+n+1 \quad \text{Eq. 1}$$

In Eq. 1, m denotes an integer value that classifies the AAD into the 128-bit block units, and v denotes the number of bits remained after classifying the AAD to 128-bit integer value. n denotes an integer value that classifies the DATA into the 128-bit block units, and u denotes the number of bits remained after classifying the AAD to 128-bit integer value.

Figure 6:
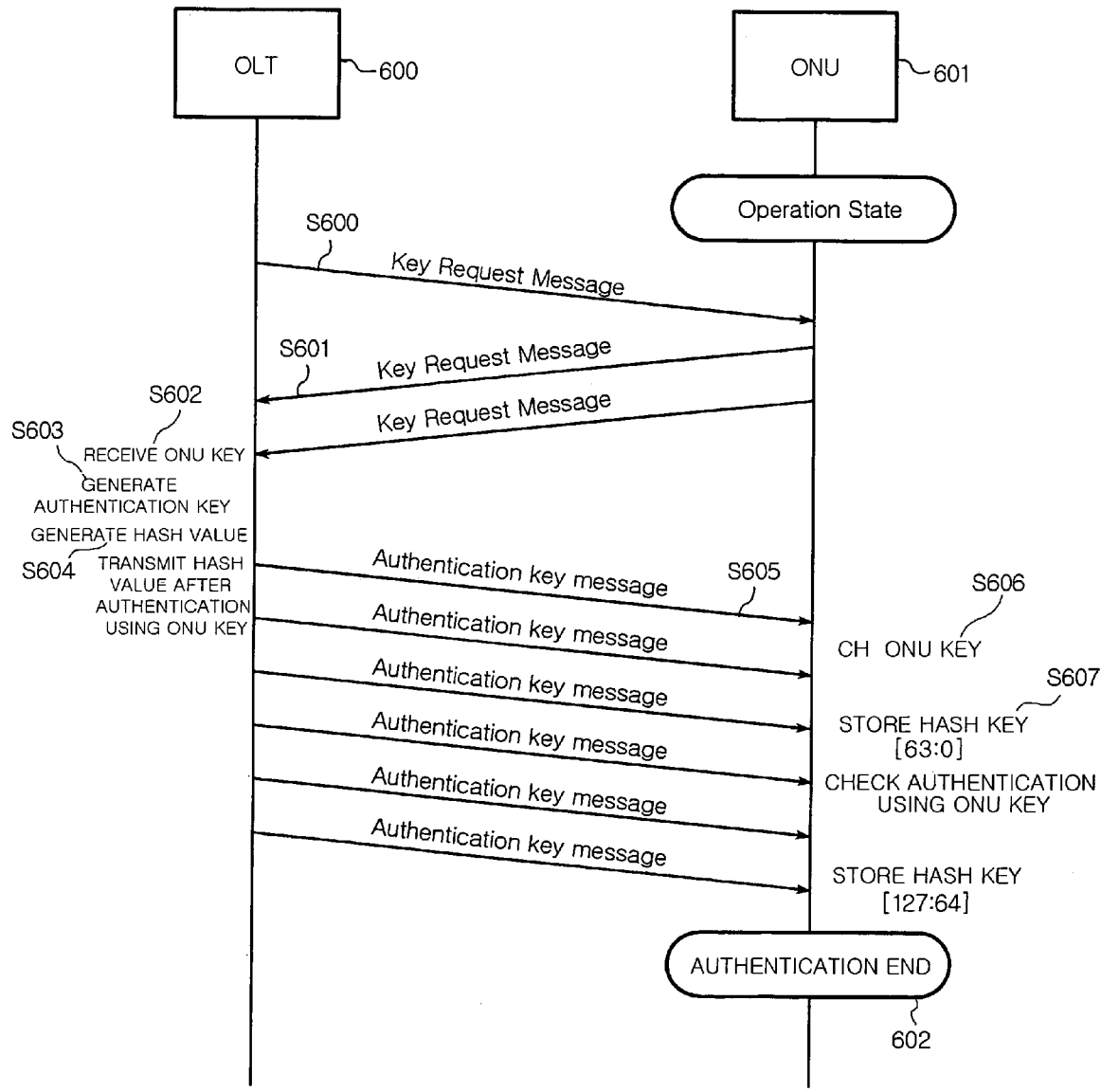
FIG. 6 is a timing diagram for distributing an authentication key and registering an authentication for ONU in order to provide an authenticated encryption function in a GPON system according to the present invention.

FIG. 6 is a timing diagram for distributing an authentication key and registering an authentication for ONU in order to provide an authenticated encryption function in a GPON system according to the present invention.

As shown in FIG. 6, the OLT 600 transmits a Key Request Message to each of the ONUs 601 to request a key value per each ONU at step S600. If the ONU 601 receives the Key Request Message at step S600, the ONU 601 generates a 128-bit ONU key, divides the 128-bit ONU key into two 64-bit ONU sub-keys, loads the two 64-bit ONU sub-keys to two Key Response Messages each and transmits the two Key Response Messages to the OLT 600 at step S601.

If the OLT 600 receives the 128 bit-ONU key from the ONU 601 at step S602, the OLT 600 generates a 128-bit authentication key at step S603. Then, the OLT 600 calculates a 128-bit hash value using the generated authentication key at step S604.

The OLT 600 authenticates the received ONU key using the hash value and transmits an authentication key message to transmit the generated hash value to the ONU 601 at step S605. The authentication key message includes the 64-bit hash value and is transmitted to each of the ONUs 601 three times.

Herein, the Authentication Key Message has a message identification '20' and is newly added to provide the authentication function according to the present invention.

The ONU 601 performs the authentication check using own ONU key at step S606. That is, if identical Authentication Key Message is received twice, the message is treated as a trustable message and the hash value included in the Authentication Key Message is stored at step S607. If the ONU 602 receives the entire 128-bit hash value, the authentication registration is completed at step S602 because the authentication check can be performed. Such exchanged messages for authentication registration are included in the PLOAM message.

Figure 7:
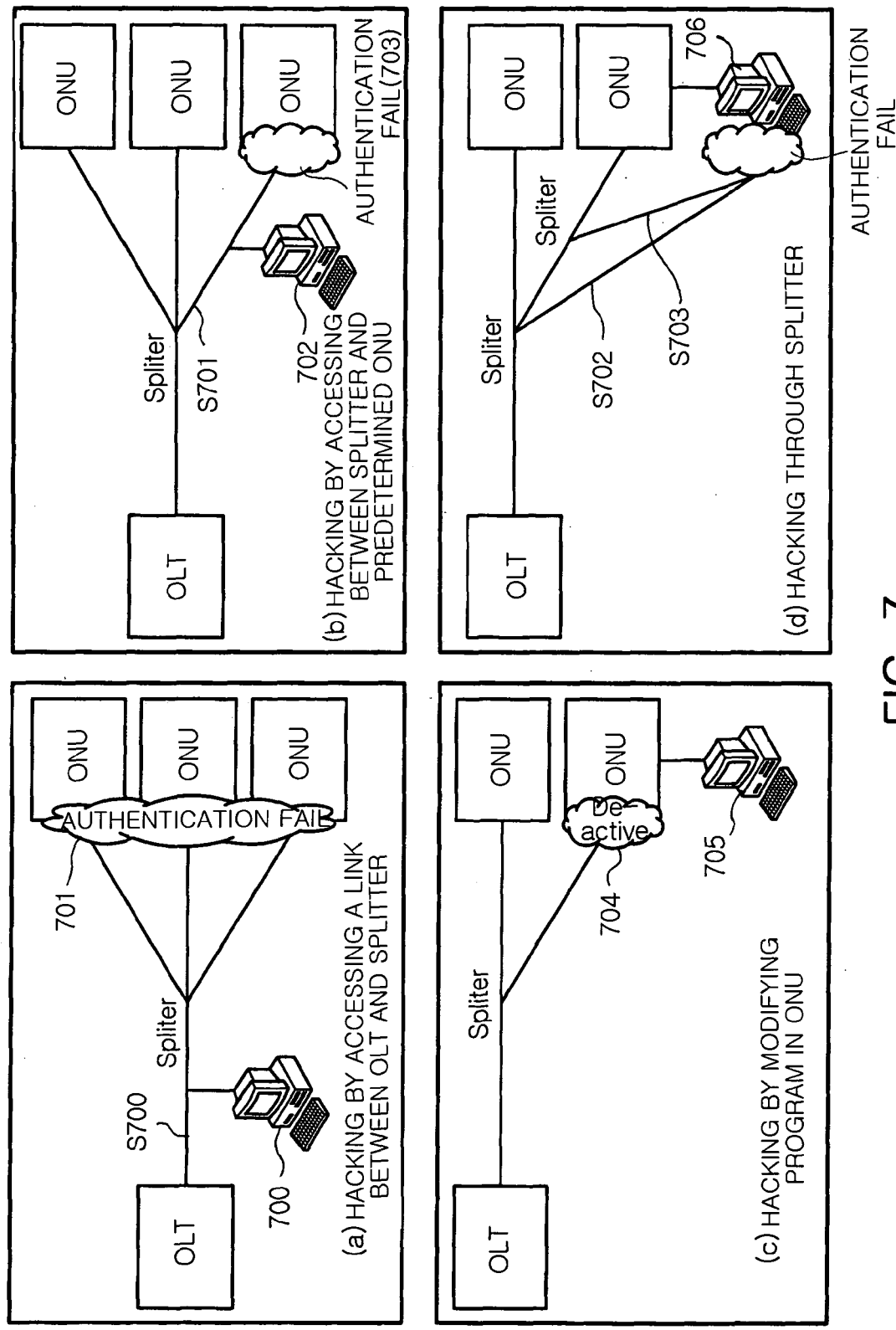
FIG. 7 is a conceptual view illustrating a possible hacking attempt made on a GPON system for providing a secured transmission through an authentication encryption according to the present invention.

FIG. 7 is a conceptual view illustrating a possible hacking attempt made on a GPON system for providing a secured transmission through an authentication encryption according to the present invention.

As shown in a block diagram (a) in FIG. 7, if a hacker 700 modifies a frame by accessing a common link S700 between an OLT and a splitter, the authentication modules in the all ONUs determine that the authentication of the GTC downlink frame is failed. Therefore, the frame modified by the hacker is blocked (701). In this case, the OLT must checks the states of the ONUs and changes to replacement links.

As shown in a block diagram (b) in FIG. 7, if a hacker 702 modifies a frame by accessing a link (S701) between a splitter and a predetermined ONU, an authentication module of the predetermined ONU determines that the authentication of the GTC downlink frame is failed to block the frame modified by the hacker (703).

As shown in the block diagrams (a) and (b), the hacker is unable to monitor because the hacker cannot receive the GTC frames transmitted along the downlink at the authentication step.

As shown in a block diagram (c) in FIG. 7, if a hacker 705 tries to receive GTC downlink frame information through a registered ONU without authenticated through a simple modification of program, the authentication module of the corresponding ONUs determines that the authentication of the GTC downlink frame is filed due to authentication cannot be performed on the GTC downlink frame. Therefore, the corresponding GTC frame is blocked (704).

Also, if the hacker 705 tries to receive GTC downlink frame information through an authenticated and registered ONU through a simple modification of a program, the authentication module of the corresponding ONU determines that the authentication of the GTC downlink frame is succeeded. Therefore, the hacker may receive the GTC downlink frame but cannot listen the payload information of other ONUs because the ONU has own ONU key. If the hacker disturbs transmission of other ONUs using header information I the received GTC downlink frame, the OLT forcedly makes the corresponding ONU inactivated (705).

As shown in a block diagram (d) in FIG. 7, if a hacker 706 tries to receive the GTC downlink frame by accessing a remained port of a splitter (S702) or adding a new splitter between the splitter and a predetermined ONU (S703), the authentication of the GTC downlink frame is failed because the hacker is not registered at the OLT. Therefore, the hacker 706 is blocked to receive the GTC downlink frame.

Figure 8:
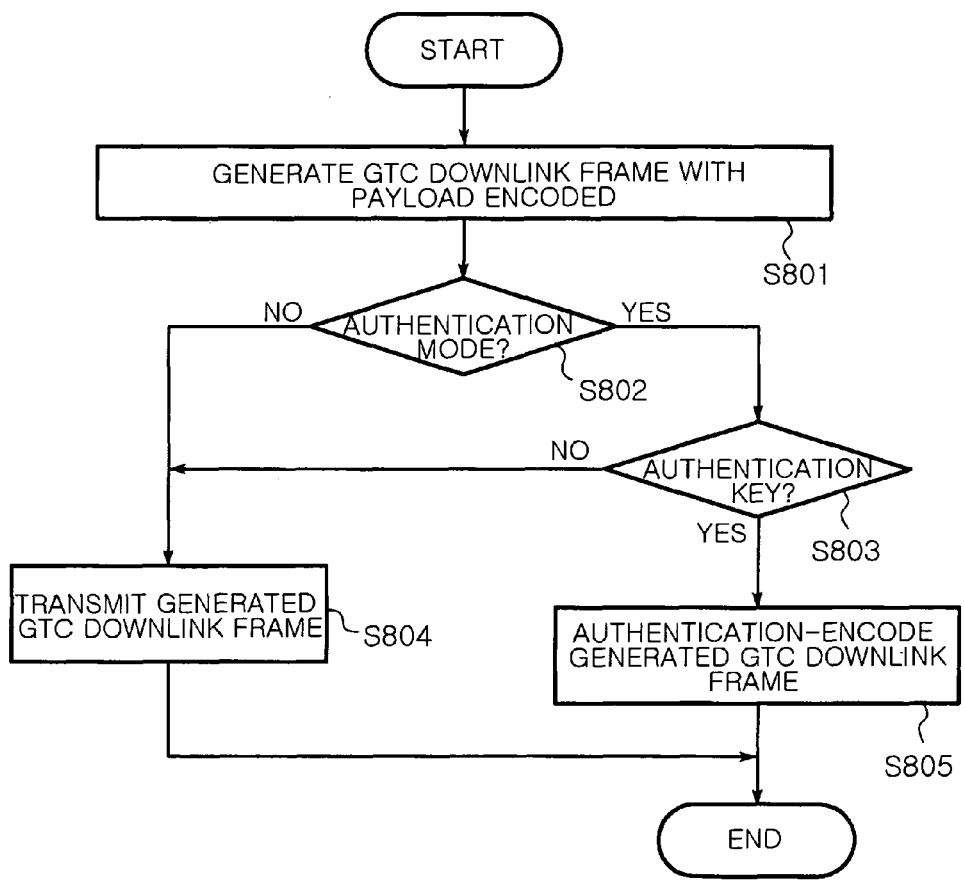
FIG. 8 is a flowchart of a method of an authenticated encryption in a GPON system for providing a secured transmission through an authenticated encryption according to an embodiment of the present invention.

FIG. 8 is a flowchart of a method of an authenticated encryption in a GPON system for providing a secured transmission through an authenticated encryption according to an embodiment of the present invention.

As shown in FIG. 8, a GTC downlink frame with an encrypted payload is generated at step S801 in the authenticated encryption method according to the present embodiment.

Then, it determines whether the generated GTC downlink frame is transmitted through an authentication mode or not at step S802. If it is the authentication mode, it determines whether an authentication key exists or not at step S803.

If the authentication key exists at step S803, the generated GTC downlink frame is encrypted for authentication and the encrypted GTC downlink frame for authentication is transmitted at step S805.

If it is not the authentication mode at step S802 or there is no authentication key at step S803, the payload of the generated GTC downlink frame is only encrypted and the GTC downlink frame with the encrypted payload is transmitted at step S804.

Although the GTC downlink frame with the encrypted payload is shown in FIG. 8, the present invention is not limited thereby. That is, the present invention can be adapted to any type of GTC downlink frame. For example, it is obvious to those skilled in the art that the present invention may be adapted to a GTC downlink frame with a payload that is not coded.

Figure 9:
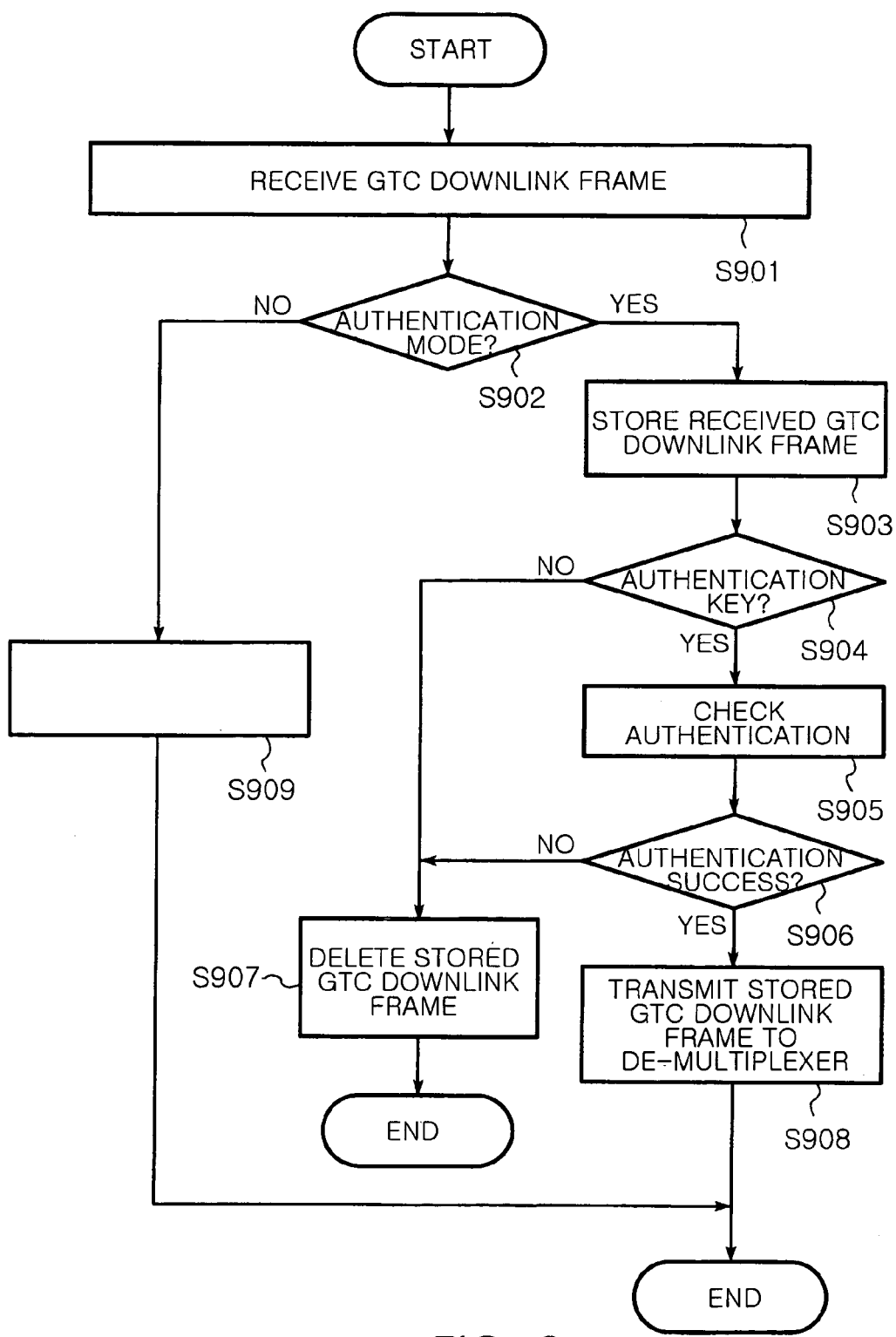
FIG. 9 is a flowchart showing a method of authenticated decryption in a GPON system for providing a secured transmission through an authenticated encryption according to the present invention.

FIG. 9 is a flowchart showing a method of authenticated decryption in a GPON system for providing a secured transmission through an authenticated encryption according to the present invention.

As shown in FIG. 9, an ONU of a GPON system receives a GTC downlink frame at step S901.

Then, it determines whether the authentication mode is used to process the received GTC downlink frame or not at step S902. If the authentication mode is used at step S902, the received GTC downlink frame is stored at step S903. If not, the GTC downlink frame is transmitted to a de-multiplexer to process a corresponding GTC downlink frame at step S909. Herein, the determination of using the authentication mode is decided by checking whether an authentication parameter value for ONU authentication is included in the end of he received GTC downlink frame or not.

Then, it determines whether an authentication key is in the received GTC downlink frame within an ONU or not at step S904.

As a result, if there is the authentication key at step S904, the received GTC downlink frame is checked for authentication at step S905. If the authentication is succeeded at step S906, the stored GTC downlink frame is transmitted to the de-multiplexer to process a corresponding GTC downlink frame at step S908.

Meanwhile, if there is no authentication key at step S904 or the authentication is failed at step S906, the stored GTC downlink frame is deleted at step S907.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk, an optical magnetic disk, and carrier waves such as data transmission through the Internet. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

As described above, the present invention allows only ONUs that are authenticated and registered at an OLT to normally receive GTC downlink frame information. Therefore, the present invention protects the GPON system from various hacking attempts.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A GPON (Gigabit-cable passive optical network) system for allowing a secured transmission through an authenticated encryption, comprising:

an OLT (optical line terminal) for receiving data from an external service provider, generating a GTC (GPON Transmission Convergence) downlink frame including a frame header and a payload and transmitting the generated GTC downlink frame through a downlink; and an ONU (optical network unit) for receiving the GTC downlink frame transmitted from the OLT through the downlink and processing the received GTC downlink frame, wherein the OLT performs an authenticated encryption on the generated GTC downlink frame including the frame header and the payload by including an authentication generator for authenticating the generated GTC downlink frame according to the ONU, and the ONU determines whether the GTC downlink frame is allowed to receive according to whether the authentication of the authentication encrypted GTC downlink frame is succeeded or failed by including an authentication checker.

2. The GPON system of claim 1, wherein the authentication generator calculates an authentication parameter value and adds the calculated authentication parameter value at the end of the GTC downlink frame in order to authenticate the generated GTC downlink frame according to the ONU.

3. The GPON system of claim 2, wherein the authentication parameter value is obtained through a GF (Galois Field) ($2^{128}$) multiplier by inputting a hash value generated using an authentication value generated at the OLT using an ONU key value provided from each of the ONUs.

4. The GPON system of claim 2, wherein the authentication checker determines whether the authentication is failed or succeeded by comparing a value obtained from a calculation using the $GF(2^{128})$ multiplier through inputting an authentication key included in the ONU and the authentication parameter value.

5. The GPON system of claim 4, wherein the authentication for the GTC downlink frame is succeeded if the authentication parameter value is identical to the value obtained from the calculation and the authentication for the GTC downlink frame is failed if the authentication parameter value is not identical to the value obtained from the calculation.

6. The GPON system of claim 5, wherein the authentication checker includes a GTC frame storing unit for storing the authentication encrypted GTC downlink frame, receives and processes the stored GTC downlink frame from the GTC frame storing unit when the authentication is succeeded, and deletes the stored GTC downlink frame in the GTC frame storing unit when the authentication is failed.

7. The GPON system of claim 4, wherein the authentication key is the hash key value transmitted from the OLT.

8. An OLT (optical line terminal) in a GPON (Gigabit-cable passive optical network) providing a secured transmission through an authenticated encryption, the OLT comprising:

a header generator for generating a frame header;
a payload generator for receiving an ATM SDU (service data unit) and a GEM SDU (service data unit) and processing the received ATM SDU and the received GEM SDU, separately;
a payload encrypter for receiving the processed ATM SDU payload and the processed GEM SDU payload from the payload generator and encrypting the processed ATM SDU payload and the processed GEM SDU payload, independently;
a multiplexer for multiplexing the header generated from the header generator and the encrypted payload from the payload encrypter to generate one GTC downlink frame; and
an authentication generator for generating an authentication parameter for an authenticated encryption of the GTC downlink frame multiplexed through the multiplexer.

9. The OLT of claim 8, wherein the authentication generator includes:

a data input unit for receiving the GTC downlink frame multiplexed through the multiplexer and outputting the received GTC downlink frame, sequentially;
an operator for performing a logical-adding on the output of the data input unit and the output of a $GF(2^{128})$ multiplier;
the GF ($2^{128}$) multiplier for receiving the output of the operator and a hash value and performing a $GF(2^{128})$ multiplication on the received outputs; and
a splitter for splitting the output of the $GF(2^{128})$ multiplier to the operator and outputting a final output of the $GF(2^{128})$ multiplier as an authentication parameter in order to add the authentication parameter to the GTC downlink frame for the authenticated encryption of the GTC downlink frame.

10. The OLT of claim 9, wherein the data input unit divides and classifies the header information of the GTC downlink frame into 128-bit block units and outputs the 128-bit block units of the header information to the operator as the AAD (additional authenticated data) value, divides and classifies the payload information of the GTC downlink frame into 128-bit block units and outputs the 128-bit block units of the payload information to the operator as the DATA value after all of the AAD values are outputted, and
combines a 64-bit of the last AAD value and a 64-bit of the last DATA value and outputs the combination result to the operator after the entire header information and payload information of the GTC downlink frame is outputted as all of the AAD values and the DATA values.

11. An ONU (optical network unit) of a GPON (gigabit-capable passive optical networks) system for providing a secured transmission through an authenticated encryption, the ONU comprising:

an optical-electric converter for receiving a GTC downlink frame having an ICV' transmitted as an optical signal from an OLT (optical line terminal) and transforming the optical signal of the GTC downlink frame to an electric signal of the GTC downlink frame;
an authentication checker for checking whether the electric GTC downlink frame having the ICV' is authenticated;
a de-multiplexer for dividing the authenticated GTC downlink frame into a header and a payload;
a header processor for receiving the header from the de-multiplexer and processing the header;
a payload decrypter for receiving the payload from the de-multiplexer and decrypting the payload; and
a payload processor for processing the decrypted payload.

12. The ONU of claim 11, wherein the authentication checker includes:

a GTC frame memory for receiving the GTC downlink frame with the ICV', temporally storing the GTC downlink frame excepting the ICV' and outputting the stored GTC downlink frame according to a result of authentication;
an ICV comparator for comparing the ICV' and an calculated ICV calculated by inputting the GTC downlink frame excepting the ICV' to the data input unit, authenticating and transmitting the result of the authentication to the GTC frame memory;
a data input unit for outputting the GTC downlink frame excepting the ICV' sequentially;
an operator for performing a logical-adding on the output of the data input unit and an output of a $GF(2^{128})$ multiplier;

the GF($2^{128}$) multiplier for receiving the output of the operator and a hash value and multiplying the received output and the hash value;

a splitter for splitting the output of the GF($2^{128}$) multiplier to the operator and outputting a final output of the GR($2^{128}$) multiplier as the ICV; and an ICV comparator for comparing the ICV' and the ICV outputted from the splitter, authenticating and transmitting the result of the authentication to the GTC frame memory.

13. The ONU of claim 12, wherein the ICV comparator determines that the authentication of the GTC downlink frame is succeeded if the ICV' and the ICV are identical, or determines that the authentication of the GTC downlink frame is failed if the ICV' and the ICV are different.

14. The ONU of claim 13, wherein the GTC frame memory receives the GTC downlink frame having the ICV', temporally stores the GTC downlink frame excepting the ICV' and transmits the stored GTC downlink frame to the de-multiplexer if the ICV comparator notices the success of the authentication, or deletes the stored GTC downlink frame if the ICV comparator notices the failure of the authentication.

15. A method of authenticated encryption in a GPON (Gigabit-cable passive optical network) system providing a secured transmission through the authenticated encryption, comprising the steps of:
   a) generating a GTC downlink frame including a frame header and a payload at an OLT (optical line terminal) in the GPON system;
   b) determining whether an authentication mode is used to transmit the generated GTC downlink frame;
   c) checking whether an authentication key is in the OLT for authentication if the authentication mode is used;
   d) authenticated encrypting the GTC downlink frame and transmitting the encrypted GTC downlink frame if there is the authentication key; and
   e) transmitting the GTC downlink frame without the authenticated encrypting if the authentication mode is not used at step b) or if there is no authentication key.

16. The method of claim 15, wherein in the step d), an authentication parameter value is calculated and the calculated authentication parameter value is added to the end of the GTC downlink frame for authenticating the generated GTC downlink frame according to the ONU.

17. A method of authenticated decryption in a GPON (Gigabit-cable passive optical network) system for providing a secured transmission through an authenticated encryption, the method comprising the steps of:
   a) receiving a GTC downlink frame including a frame header and a payload at an ONU (optical network unit) in the GPON system;
   b) determining whether an authentication mode is used to process the received GTC downlink frame, and storing the received GTC downlink frame if the authentication mode is used;
   c) checking whether there is an authentication key to authenticate the GTC downlink frame stored in the ONU;
   d) checking the authentication of the stored GTC downlink frame if there is the authentication key, transmitting the stored GTC downlink frame if the authentication of the GTC downlink frame is succeeded and processing the GTC downlink frame; and
   e) deleting the stored GTC downlink frame if there is no authentication key at the step c) or if the authentication is failed at the step d).

18. The method of claim 17, further comprising the step of f) transmitting the GTC downlink frame to the de-multiplexer if the authentication mode is not used in the step b) and processing the GTC downlink frame.

19. The method of claim 17, wherein the determination of the authentication mode is decided by determining whether an authentication parameter value for authenticating the received GTC downlink frame according to the ONU is added at the end of the received GTC downlink frame.

* * * * *